April 8, 1952 — O. SCHNYDER — 2,592,474
TWIN PLUNGER VALVE
Filed Nov. 16, 1945 — 3 Sheets-Sheet 1

INVENTOR:
Ottmar Schnyder
by Sommers & Young
Attorneys

April 8, 1952   O. SCHNYDER   2,592,474
TWIN PLUNGER VALVE
Filed Nov. 16, 1945   3 Sheets-Sheet 2

INVENTOR:
Ottmar Schnyder
by Sommers & Young
Attorneys

April 8, 1952     O. SCHNYDER     2,592,474
TWIN PLUNGER VALVE
Filed Nov. 16, 1945     3 Sheets-Sheet 3
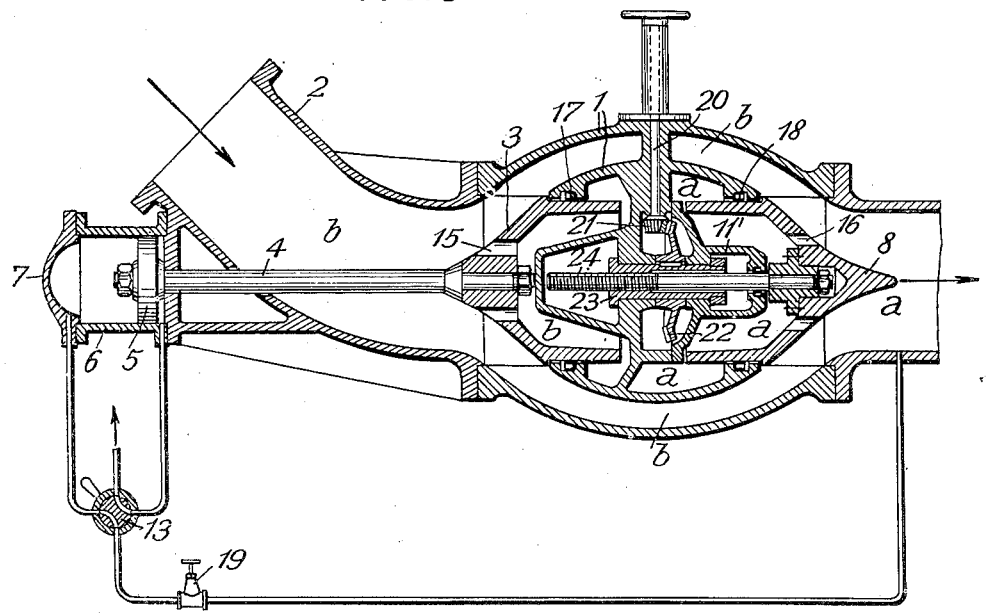
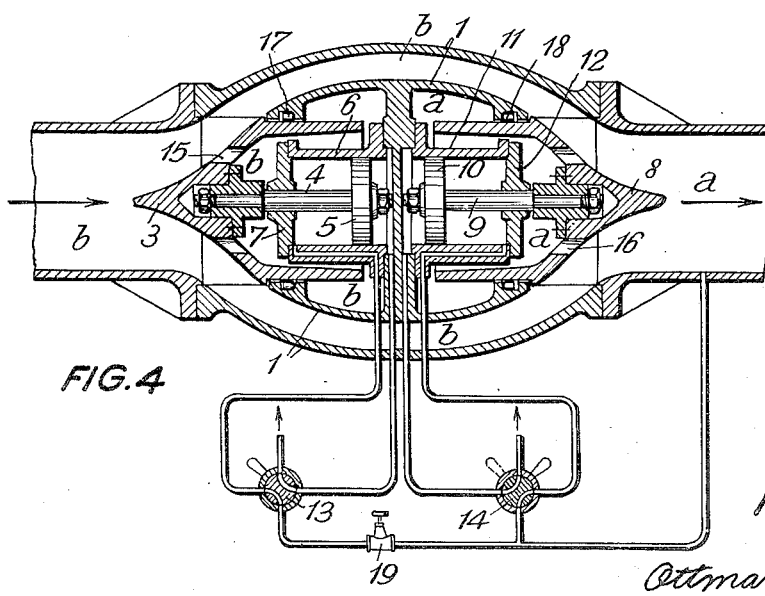

Patented Apr. 8, 1952

2,592,474

UNITED STATES PATENT OFFICE 2,592,474

TWIN PLUNGER VALVE

Ottmar Schnyder, Klus, near Balsthal, Switzerland, assignor to Gesellschaft der Ludw. von Roll'schen Eisenwerke A. G., Klus, Switzerland Application November 16, 1945, Serial No. 629,099
In Switzerland November 16, 1944

1 Claim. (Cl. 137—144)

Between feed pumps and the discharge or pressure line connected thereto, a closure valve is commonly provided for. In many cases the said valve has to act as high-speed or quick-action closing device when the pump drive is failing, as well as throttling device for regulating the discharge. For this two-hold purpose, plunger or ring valves have proved particularly suitable on account of their favorable flow-passages in the intermediate throttling positions.

In cases where a plurality of pumps are connected to a common discharge manifold or header, the provision of a single valve between each pump and the pressure line is no longer sufficient, if, in case of a valve failure, one desires to hold the other pumps in operation, while dismantling and overhauling the said valve, without emptying the discharge line.

Such a possibility has been provided for in prior pumping layouts by using a second valve between each primary pump valve, which preferably is adapted as a plunger valve, and the discharge lines, which latter valve is called a reserve valve.

The present invention provides a simpler and cheaper solution, which eliminates the provision of a special reserve valve. The present plunger valve is adapted as twin valve, and comprises two separate and independently operated plunger valves enclosed in a common valve body. One of the said valves may be taken out of the said body, for repairing or overhauling purposes, without in any way disturbing the position or operation of the second valve. When, e. g., the one valve is closed against the pressure head in the discharge line, the other may be taken down as in the case of two valves set in line. When using the valve according to the present invention in a pumping plant, the valve unit on the pump-side acts as a quick-action and throttling valve, while the other valve, disposed on the side of the pressure line, serves as a reserve valve.

Figure 1:
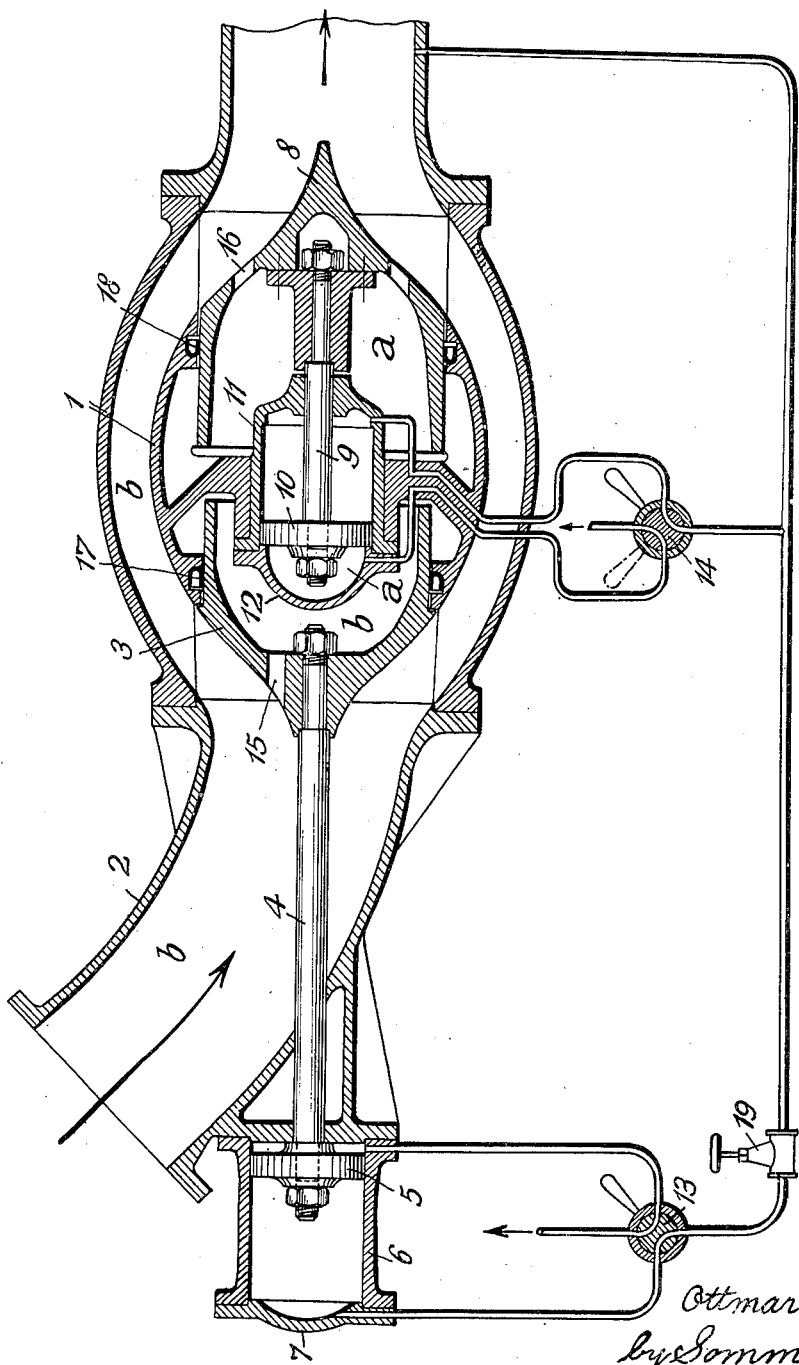
Figure 2:
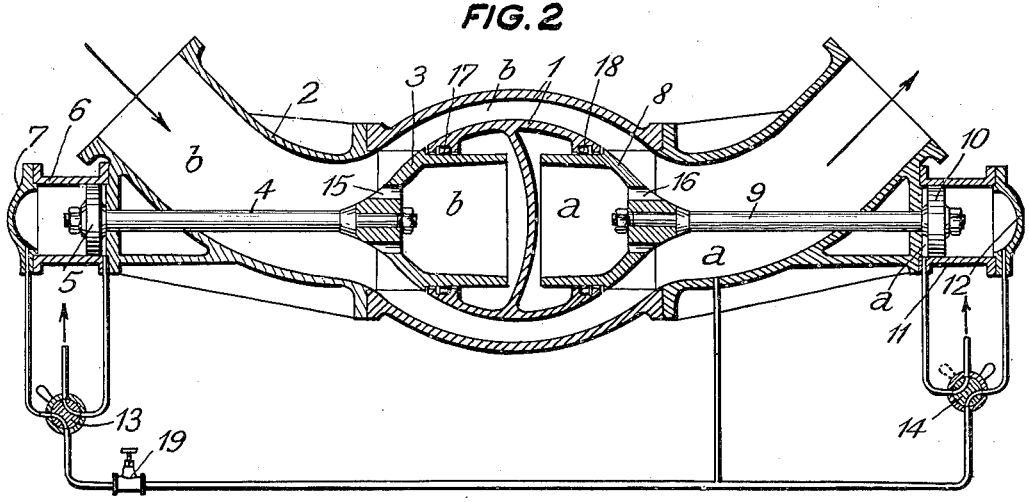
Figure 3:
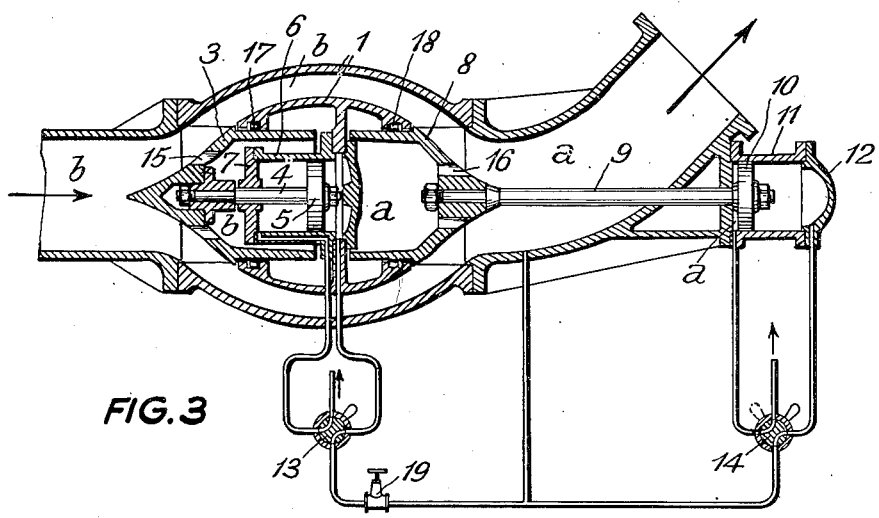

The twin-plunger valve according to the present invention is shown in various embodiments and arrangements in the accompanying drawings, in the wide-open position and in sectional elevation, and in which Fig. 1 illustrates a hydraulically operated first form of invention, in which the drive or servomotor for the quick action and throttling valve is located outside, and that for the reserve valve inside of the common valve body;

Fig. 2 a hydraulically operated second form, in which the two servo-motors are located outside of the valve body, Fig. 3 a third form, in which the pipe bend is connected to the outlet side, i. e. the pressure-line side of the valve, the reserve-valve pilot drive being outside of and the other drive inside the valve body;

Fig. 4 a fourth form, in which both hydraulical drives are located within the valve body; and Fig. 5 a fifth form, in which one valve is mechanically operated, and the other hydraulically.

The twin-plunger valve comprises a body 1, a pipe bend 2 preferably intermediate of the latter and the pump, a plunger 3 acting as high-speed closing and throttling valve, a piston rod 4, a servo piston 5, a cylinder 6 and cover 7; and a second or reserve plunger 8 on the side of the pressure line, a piston rod 9, a piston 10, and a cylinder 11 and cover 12.

The two pistons 5 and 10 are hydraulically operated, with the exception of the form shown in Fig. 5 in which the plunger stem is mechanically or manually operated. The control liquid may be supplied from a separate pressure-liquid supply or, as shown in the drawings, from the fluid in the discharge pipe line, and is caused to act, by means of the two-way control valves 13 and 14, upon the opening or closing face respectively of the pistons.

In order to reduce the size of the latter, the plungers 3 and 8 may, as shown in the drawings, be provided with pressure-balancing ports 15 and 16.

Tight seats must then be provided for the said plungers by means of the sleeve packings 17 and 18. When the reserve plunger 8 is closed, by swinging the lever of the plug valve 14 into the position shown by dotted lines, the chambers designated by *a* remain under pressure, but the chambers designated by *b*—with the respective pump out of operation—are relieved from this pressure. By shutting off the control liquid from the servomotor 6, by means of the small valve or cock 19, the valve portions 2—7 and 13 may be taken off for overhauling purposes.

The modifications shown in Figs. 2-5 are self-explanatory in the light of the first embodiment described with reference to Fig. 1. In the form illustrated in Fig. 5, the drive for the reserve plunger 8 is of the mechanical type. The horizontal and axial plunger stem 24 is turned by way of the manually operated spindle 20, and the bevel gears 21 and 22 in the stationary sleeve nut 23 onto which the bevel gear 22 is keyed.

Twin-plunger valves according to the present invention also may be used for other purposes than quick-action pump-closing and throttling devices and reserve valves. They may be employed, e. g., as turbine-closing devices in the case of a plurality of machine aggregates being connected to a common penstock manifold or header.

What I claim and desire to secure by Letters Patent is:

In a ring valve, in combination with two coaxially disposed separate and independently actuated cut-off means and a common casing for both of said means, the said casing having the form of a surface of revolution, means for independently actuating each of said cut-off means, the actuating means of the downstream cut-off means being hydraulic, said downstream cut-off means and its hydraulic actuating means being demountable from the casing together for overhauling purposes when the upstream cut-off means is actuated to closing position, without the necessity of draining the pressure line.

OTTMAR SCHNYDER.

REFERENCES CITED

The following references are of record in the file of this patent:

UNITED STATES PATENTS

| Number | Name | Date |
|---|---|---|
| 881,412 | Knight | Mar. 10, 1908 |
| 1,290,722 | Doble | Jan. 7, 1919 |
| 1,517,504 | Hansen | Dec. 2, 1924 |
| 1,519,136 | Hansen | Dec. 16, 1924 |
| 1,540,279 | Pry | June 2, 1925 |
| 1,555,075 | Pownall | Sept. 29, 1925 |
| 1,727,517 | Moody | Sept. 10, 1929 |
| 2,085,893 | Boland | July 6, 1937 |
| 2,088,261 | Dinenthal | July 27, 1937 |